United States Patent
Chen et al.

(10) Patent No.: US 9,577,324 B2
(45) Date of Patent: Feb. 21, 2017

(54) WEARABLE ELECTRONIC DEVICE

(71) Applicant: Quanta Computer Inc., Taoyuan (TW)

(72) Inventors: Chun-Lung Chen, Taoyuan (TW); Ji-Dein Wu, Taoyuan (TW); Shih-Ling Huang, Miaoli County (TW); Yu-Feng Lin, Taoyuan (TW); Yen-Liang Liu, Taoyuan (TW); Ko-Chun Wang, Taoyuan (TW); Yu-Liang Chen, Taoyuan (TW); Chiung-Chang Tsai, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 7 days.

(21) Appl. No.: 14/731,170

(22) Filed: Jun. 4, 2015

(65) Prior Publication Data
US 2016/0261037 A1 Sep. 8, 2016

(30) Foreign Application Priority Data

Mar. 2, 2015 (TW) .............................. 104203086 U

(51) Int. Cl.
*H01Q 1/44* (2006.01)
*G06F 1/16* (2006.01)
*H01Q 1/27* (2006.01)

(52) U.S. Cl.
CPC ................ *H01Q 1/44* (2013.01); *G06F 1/163* (2013.01); *G06F 1/1637* (2013.01); *G06F 1/1698* (2013.01); *H01Q 1/273* (2013.01)

(58) Field of Classification Search
CPC .............. H01Q 1/44; H01Q 2/73; G06F 1/163
USPC .......................... 343/850, 702, 84, 787, 718
See application file for complete search history.

(56) References Cited

U.S. PATENT DOCUMENTS

| | | | | |
|---|---|---|---|---|
| 2002/0044501 A1* | 4/2002 | Sato | .................. | G04B 37/12 368/281 |
| 2006/0220957 A1* | 10/2006 | Tanaka | ................... | H01Q 1/273 343/700 R |
| 2011/0012796 A1* | 1/2011 | Kim | ..................... | H01Q 1/273 343/702 |
| 2015/0130666 A1* | 5/2015 | Pan | ....................... | H02J 7/0045 343/702 |

* cited by examiner

*Primary Examiner* — Peguy Jean Pierre
(74) *Attorney, Agent, or Firm* — Rabin & Berdo, P.C.

(57) ABSTRACT

A wearable electronic device includes a main body, a watchband spring pin engaged with one side of the main body, and a wrist-worn watchband connected to the watchband spring pin. The main body includes a wireless communication module and a conductive member electrically connected to the wireless communication module. The watchband spring pin is physically connected to the conductive member on the main body to be an antenna unit of the wireless communication module.

12 Claims, 5 Drawing Sheets

WEARABLE ELECTRONIC DEVICE

RELATED APPLICATIONS

This application claims priority to Taiwan Application Serial Number 104203086, filed Mar. 2, 2015, which is herein incorporated by reference.

BACKGROUND

Field of Disclosure

The present disclosure relates to an electronic device. More particularly, the present disclosure relates to a wearable electronic device.

Description of Related Art

In a current wearable electronic device (e.g., glasses or earphone device etc.), a wireless communication antenna is needed therein for exchanging electric signals with an external device. In practice, the wireless communication antenna normally has an "L" shape in which one part of the wireless communication antenna is uprightly inserted on a wiring board, and the other part being perpendicular to the part thereof is parallel to a plane of the wiring board and is located above the plane of the wiring board.

However, since the "L" shaped wireless communication antenna is not easy to be fixed upon a wiring board, the manufacturing cost and defect rate of current wearable electronic devices cannot be effectively reduced. Also, since the other part of the "L" shaped wireless communication antenna is parallel to the plane of the wiring board and is located above the plane of the wiring board, the "L" shaped wireless communication antenna is not easy to be remain or be maintained in an expected position above the wiring board so that the anticipated capability and performance of the "L" shaped wireless communication antenna is not easy to be measured correctly after the current wearable electronic device is finished assembly.

Therefore, how to provide a solution to effectively solve the aforementioned inconvenience and shortages and to increase the competitiveness of industries shall be seriously concerned.

SUMMARY

One objection of the disclosure is to provide a wearable electronic device to overcome the defects and inconvenience of the prior art.

For achieving the aforementioned objection, according to one embodiment, a wearable electronic device is provided, and the wearable electronic device includes a main body, an antenna unit and a wearable member. The main body includes an external housing, a wireless communication module, a joint portion and a conductive member. The external housing has an accommodation space therein. The wireless communication module is disposed in the accommodation space. The joint portion is disposed on one side of the external housing. The conductive member has two opposite portions in which one portion thereof is embedded in the joint portion, and the other portion thereof is electrically connected to the wireless communication module in the accommodation space. The antenna unit is engaged with the joint portion, and physically contacted with the other portion of the conductive member. The wearable member is connected to the joint portion at the antenna unit for wearing on a human body.

Therefore, since the antenna unit of the wearable electronic device in the embodiment also can be a connection of the wearable member and the main body, thus, the drawback of the wireless communication antenna of the current wearable electronic device is not only difficult to be placed into a fixed position must be alleviated so as to effectively reduce the manufacture cost and the defect rate, but also the anticipated capability and performance of the antenna unit can be measured easily because of the antenna unit being able to stay still in an expected position after the current wearable electronic device is finished assembly.

In one or more embodiments, the wireless communication module includes a wiring board, a wireless communication unit and an electrical connection portion. The wireless communication unit and the electrical connection portion are respectively disposed on the wiring board, and the electrical connection portion is electrically connected to the conductive member and the wireless communication unit.

In one or more embodiments, the electrical connection portion is a metal boss or a metal clip.

In one or more embodiments, the wearable electronic device further comprises a display module. The display module is disposed on the external housing and exposed outwards from another side of the external housing, and electrically connected to the wireless communication module, and the antenna unit and the display module are respectively located at the different sides of the external housing. Thus, since the antenna unit and the display module are separated in a vertical axis, the antenna unit will not be shielded by the display module so that the transmission capability of the antenna unit will not be weakened by the display module.

In one or more embodiments, the wireless communication module is a blue-tooth wireless communication module, an infrared transmission module, a radio frequency identification (RFID) module, a WIFI network module or a near-field communication (NFC) module.

In one or more embodiments, the wearable electronic device is a digital watch, a pair of glasses or a set of earphones.

In one or more embodiments, the wearable member is a wrist-worn watchband, and the antenna unit is a watchband spring pin for being engaged with the joint portion.

In another embodiment of the disclosure, the wearable electronic device includes a main body, a first watchband spring pin, a second watchband spring pin and at least one wrist-worn watchband. The main body includes a wireless communication module and a conductive member. The conductive member is electrically connected to the wireless communication module. The first watchband spring pin is engaged with a first side of the main body, and physically contacted with the conductive member to be an antenna unit of the wireless communication module. The second watchband spring pin is engaged with a second side of the main body being opposite to the first side thereof. The wrist-worn watchband is connected to the first watchband spring pin and the second watchband spring pin.

In one or more embodiments, a display module is further provided in the wearable electronic device, and the display module is disposed on a third side of the main body and arranged between the first side and second side thereof, and electrically connected to the wireless communication module.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
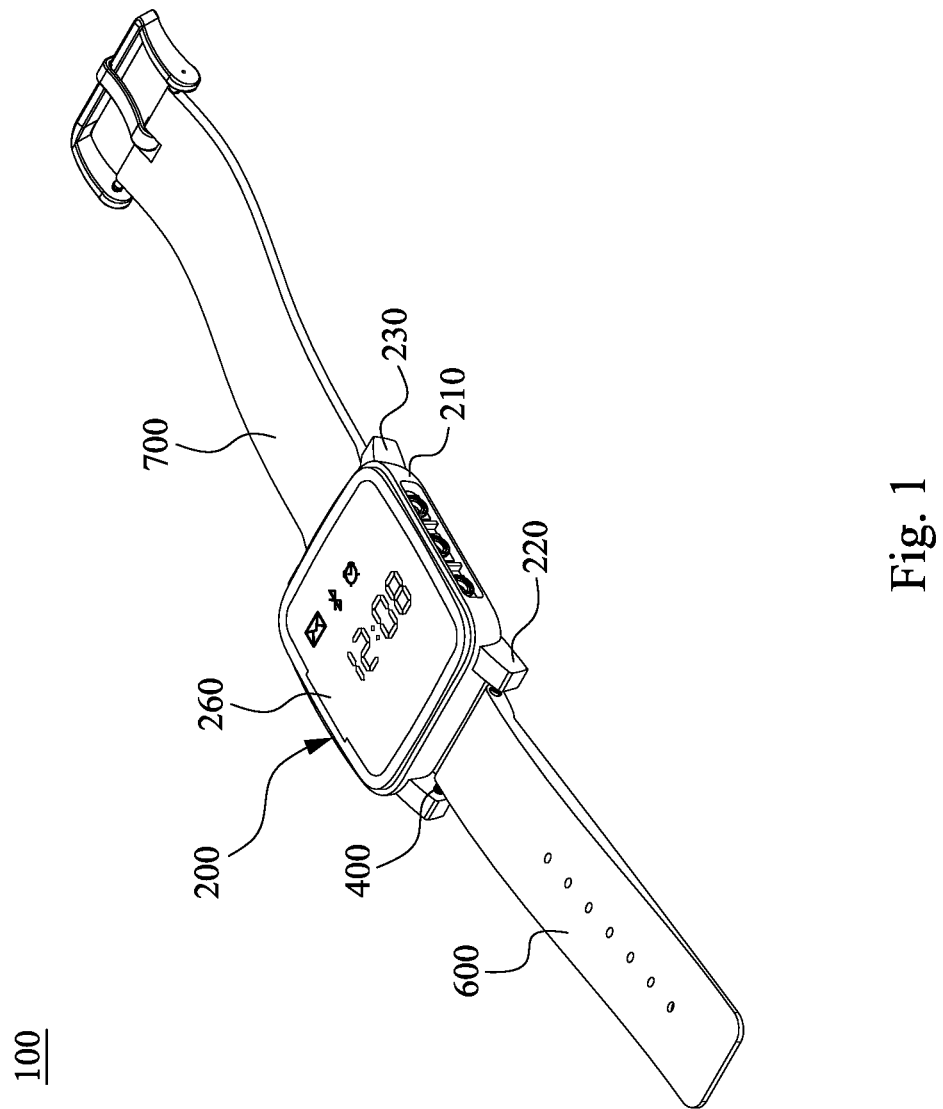
FIG. 1 is a perspective view of a wearable electronic device according to an embodiment of this disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the disclosure.

As used herein, "around," "about", or "approximately" shall generally mean within 20 percent, preferably within 10 percent, and more preferably within 5 percent of a given value or range. Numerical quantities given herein are approximate, meaning that the term "around," "about", or "approximately" can be inferred if not expressly stated.

As the wireless communication antenna of the current wearable electronic device is not easy to be fixed to be still in an expected position so that the anticipated capability and performance of the wireless communication antenna cannot be measured correctly, according to one embodiment of the disclosure, a wearable electronic device includes a main body, an antenna unit and a wearable member. The antenna unit is disposed out of the main body to be a connection of the wearable member and the main body, and is electrically connected to the wireless communication antenna in the main body. Therefore, the disclosure not only solves the drawback of the wireless communication antenna of the current wearable electronic device not easy to be fixed to effectively reduce the manufacture cost and the defect rate, but also the anticipated capability and performance of the antenna unit can be measured correctly because the antenna unit is able to be still in an expected position after the current wearable electronic device is finished assembly.

Figure 2:
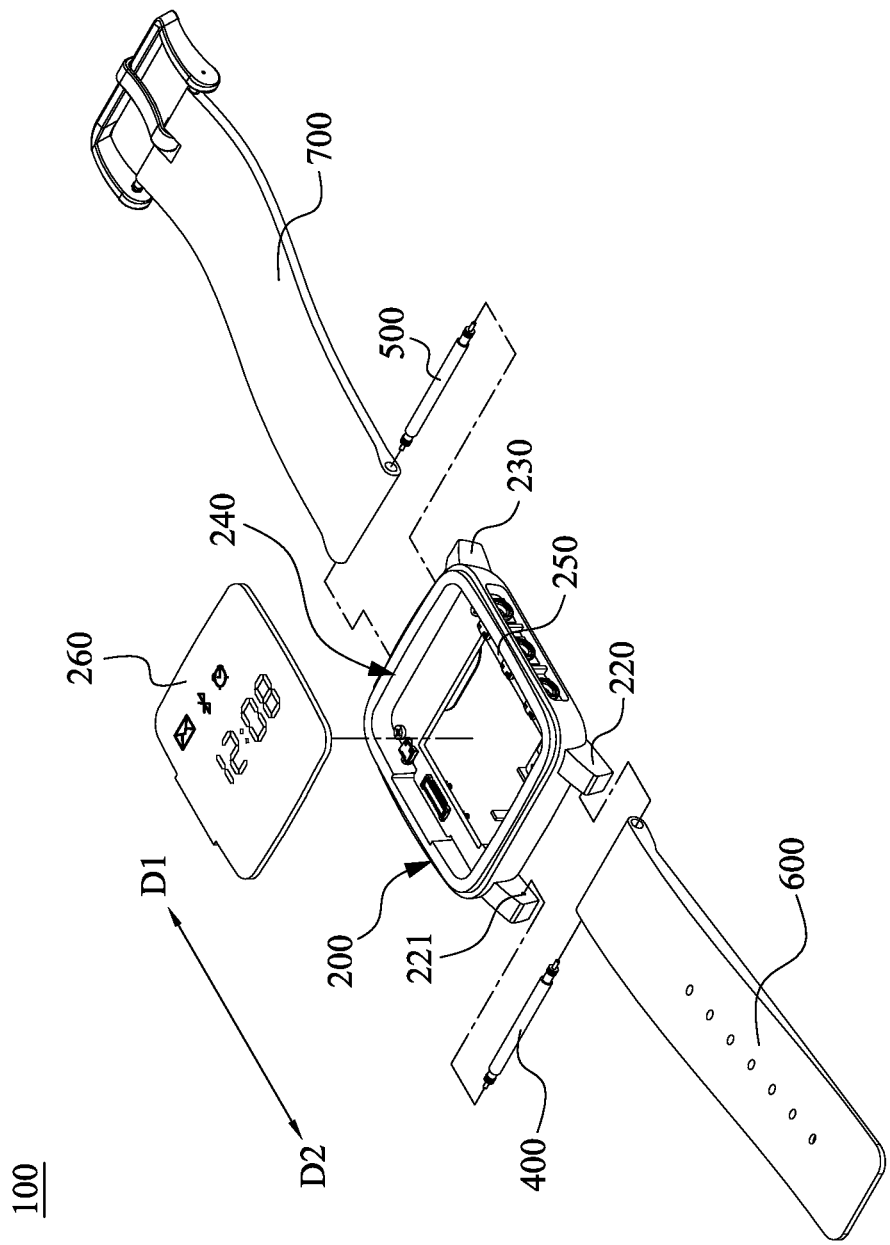
FIG. 2 is a partial exploded view of FIG. 1.

FIG. 1 is a perspective view of a wearable electronic device 100 according to an embodiment of this disclosure, and FIG. 2 is a partial exploded view of FIG. 1. As shown in FIG. 1 and FIG. 2, the wearable electronic device 100 for example is a wrist-worn digital watch, and includes a main body 200, a first watchband spring pin 400, a second watchband spring pin 500 and a wrist-worn watchband (e.g., a first watchband 600 and a second watchband 700). The main body 200 includes an external housing 210. The external housing 210 includes a first joint portion 220 and a second joint portion 230 which are respectively disposed on two oppose sides of the external housing 210. The first watchband spring pin 400 is engaged with the first joint portion 220 after the first watchband spring pin 400 passing through the first watchband 600. The first watchband 600 is coupled to the first watchband spring pin 400, and attached to the main body 200 through the first watchband spring pin 400. The second watchband spring pin 500 is engaged with the second joint portion 230 after the second watchband spring pin 500 passing through the second watchband 700. The second watchband 700 is coupled to the second watchband spring pin 500, and attached to the main body 200 through the second watchband spring pin 500. Thus, the wearable electronic device 100 can be worn on a human body by the aforementioned wearable member (i.e., the first watchband 600 and the second watchband 700). However, the disclosure is not limited thereto, in another embodiment, the wearable member also can be a single watchband (e.g., an elastic band or a bracelet), not two separated watchbands.

Figure 3A:
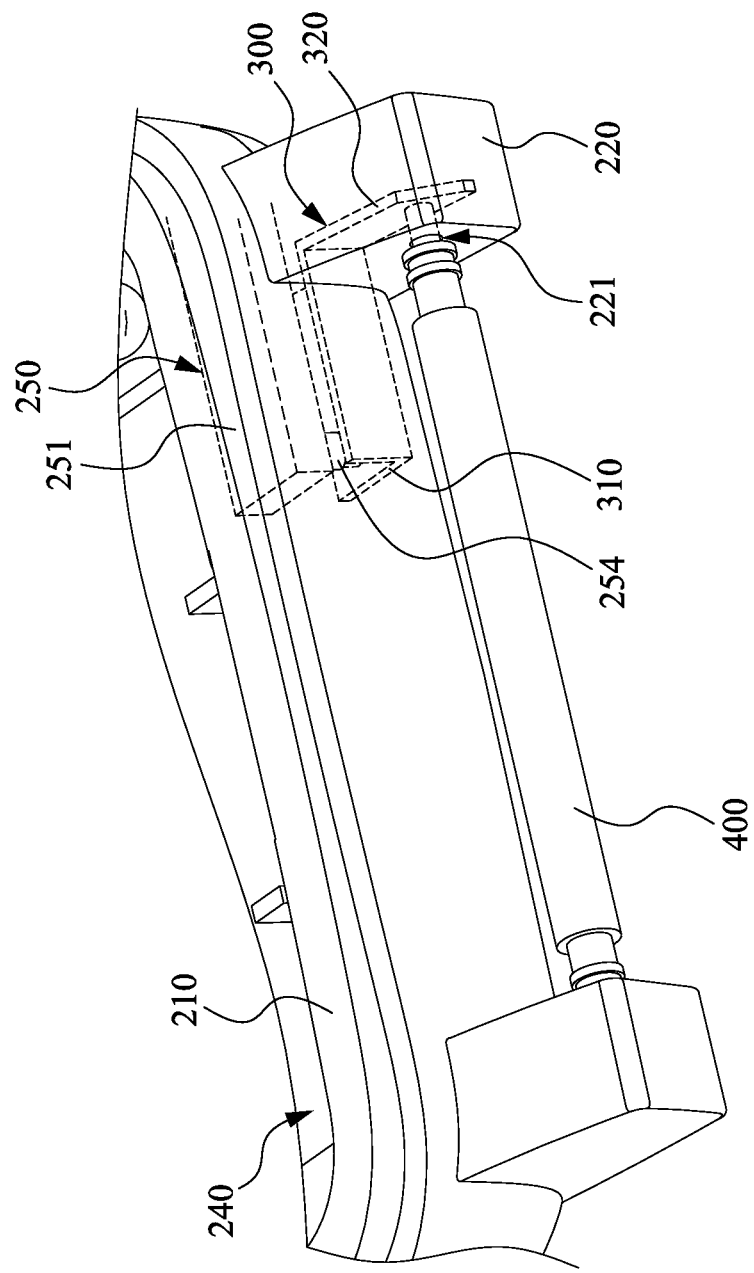
FIG. 3A is a partial schematic view of the wearable electronic device viewed along a direction D1 of FIG. 2 towards the first watchband spring pin.

FIG. 3A is a partial schematic view of the wearable electronic device 100 viewed along a direction D1 of FIG. 2 towards the first watchband spring pin 400. As shown in FIG. 2 and FIG. 3A, the main body 200 further comprises a wireless communication module 250 and a conductive member 300. The wireless communication module 250 is located in an accommodation space 240 of the external housing 210. One part 310 of the conductive member 300 is embedded in the first joint portion 220, which is formed by injection molding technologies exemplarily, and the other part 320 of the conductive member 300 extends into the accommodation space 240 to electrically connect to the wireless communication module 250. One end of the first watchband spring pin 400 engaged with the first joint portion 220 is in physical contact with the other part 320 of the conductive member 300. Thus, since the first watchband spring pin 400 is an electrically conductive material, the first watchband spring pin 400 can electrically conduct to the wireless communication module 250 through the conductive member 300 so that the first watchband spring pin 400 can be an antenna unit of the wireless communication module 250.

More particularly, the first joint portion 220 is provided with two engaging holes 221 and two opposite ends of the first watchband spring pin 400 are inserted into the engaging holes 221. A part of the conductive member 300 embedded in the first joint portion 220 is exposed outwards from one of the engaging holes 221. Thus, since each end of the first watchband spring pin 400 is respectively provided with a pogo pin connector, thus, when the first watchband spring pin 400 is engaged with the first joint portion 220, each of the pogo pin connectors extends into the corresponding engaging hole 221 to directly contact with the conductive member 300 for electrically connecting to the wireless communication module 250 through the conductive member 300.

Figure 3B:
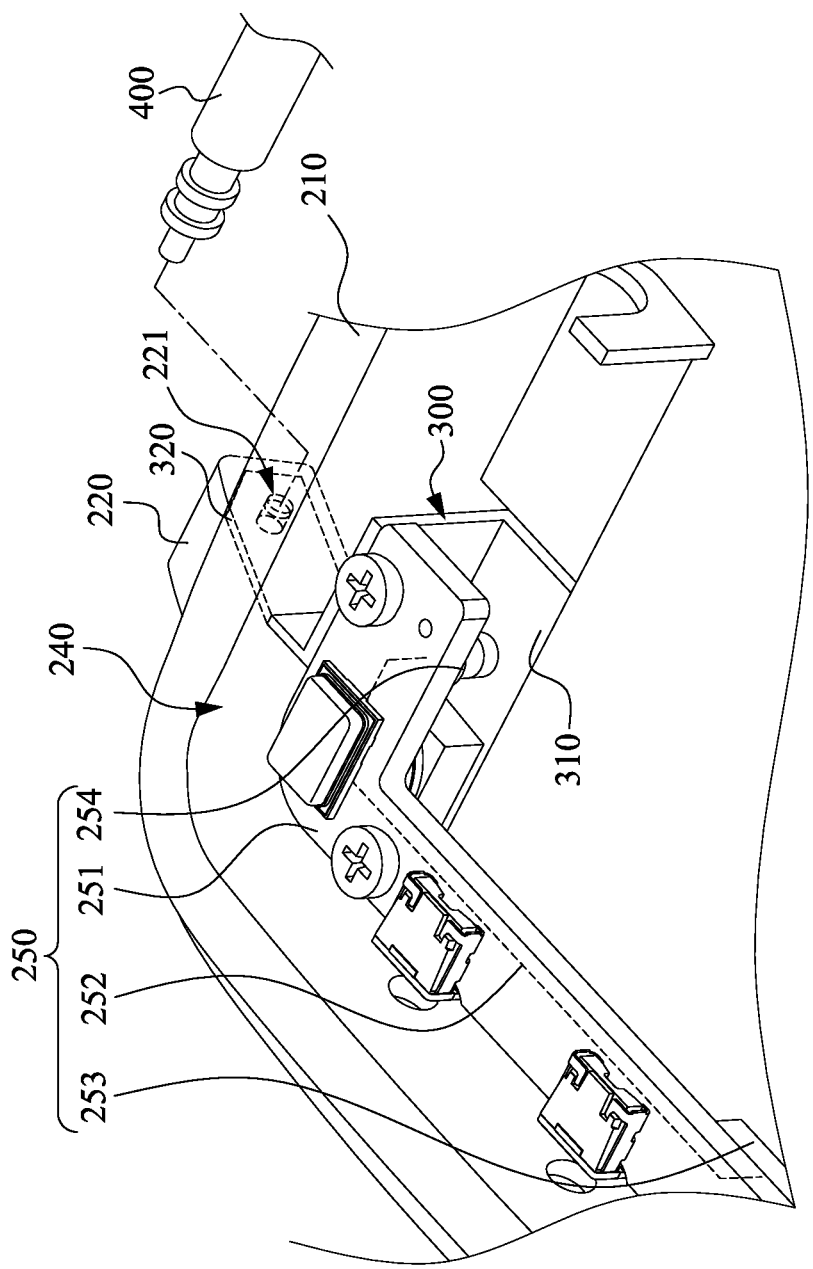
FIG. 3B is a partial schematic view of the wearable electronic device viewed along a direction D2 of FIG. 2 towards the first watchband spring pin.

FIG. 3B is a partial schematic view of the wearable electronic device 100 viewed along a direction D2 of FIG. 2 towards the first watchband spring pin 700. As shown in FIG. 3A and FIG. 3B, specifically, the wireless communication module 250 includes a wiring board 251, a wireless communication unit 253 and an electrical connection portion 254. The wiring board 251 is secured in the accommodation space 240, and is provided with a circuit pattern 252 thereon. The wireless communication unit 253 is soldered on the circuit pattern 252 of the wiring board 251. The electrical connection portion 254 is soldered on the circuit pattern 252 of the wiring board 251, and is electrically connected to the wireless communication unit 253 through the circuit pattern 252. The electrical connection portion 254 for example, is a metal boss (e.g., pogo pin), and the metal boss directly contacts with the other part 320 of the conductive member 300 so as to electrically connect to the first watchband spring pin 400 through the conductive member 300. However, the disclosure is not limited thereto, in another embodiment, the electrical connection portion also can be a metal clip, and the metal clip is allowed to electrically connect to the first watchband spring pin by clipping the conductive member.

Figure 4:
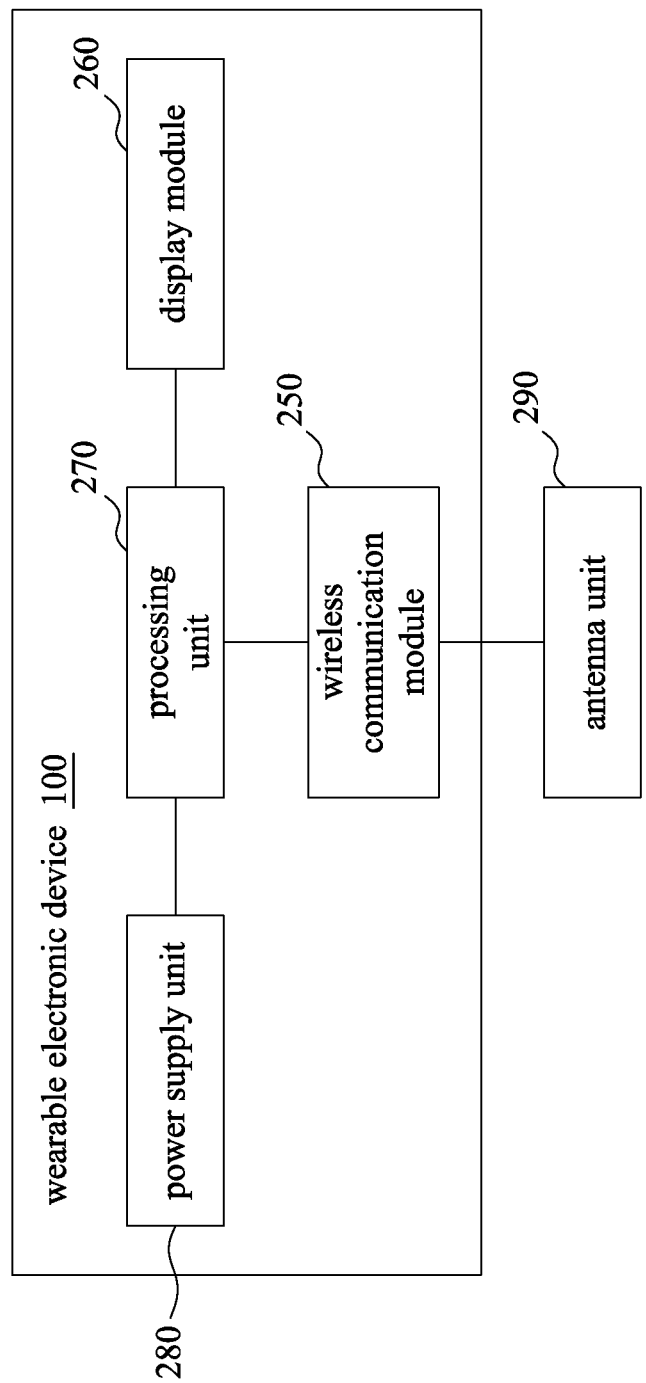
FIG. 4 is a block diagram illustrating the wearable electronic device according to the embodiment of this disclosure.

FIG. 4 is a block diagram illustrating the wearable electronic device 100 according to the embodiment of this disclosure. In the embodiment, as shown in FIG. 2 and FIG. 4, the wearable electronic device 100 further includes a display module 260. The display module 260 is electrically connected to the wireless communication module 250, and exposed outwards from the top side of the external housing 210 arranged between the first watchband spring pin 400 and the second watchband spring pin 500. Therefore, since the first watchband spring pin 400 and the display module 260 are separated in a vertical axis, the first watchband spring pin 400 will not be shielded by the display module 260 so that the transmission capability of the antenna unit will not be weakened by the display module.

The wearable electronic device 100 further includes a processing unit 270 and a power supply unit 280. The processing unit 270 is electrically connected to the display module 260, the power supply unit 280 and the wireless communication module 250. Thus, after the antenna unit 290 (i.e., the first watchband spring pin) receives wireless information, the antenna unit 290 transfers the wireless information to the wireless communication module 250. After the wireless communication module 250 processes the wireless information, the wireless communication module 250 sends the processed wireless information to the display module 260 so that the display module 260 displays the processed wireless information externally. The power supply unit 280 provides enough electric power to the processing unit 270, the display module 260 and the wireless communication module 250 mentioned above.

In the embodiments, the wearable electronic device 100 can be a wrist-worn digital watch, however, the disclosure is not limited thereto, and the wearable electronic device also can be a wearable glasses device or an earphone device. Furthermore, the wireless communication module is a bluetooth wireless communication module. However, the disclosure is not limited thereto, in another embodiment, the wireless communication module also can be an infrared transmission module, a radio frequency identification (RFID) module, a WIFI network module or a near-field communication (NFC) module.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A wearable electronic device, comprising:
 a wearable member for wearing on a human body;
 a main body comprising:
  an external housing having an accommodation space therein;
  a wireless communication module disposed in the accommodation space;
  a joint portion disposed on one side of the external housing; and
  a conductive member having one portion thereof embedded in the joint portion and an other portion thereof electrically connected to the wireless communication module in the accommodation space; and
 a pin-shaped antenna unit extending through the wearable member and engaged with the joint portion, and physically contacted with the other portion of the conductive member.

2. The wearable electronic device of claim 1, wherein the wireless communication module comprises:
 a wiring board;
 a wireless communication unit disposed on the wiring board; and
 an electrical connection portion disposed on the wiring board, and electrically connected to the conductive member and the wireless communication unit.

3. The wearable electronic device of claim 2, wherein the electrical connection portion is a metal boss or a metal clip.

4. The wearable electronic device of claim 1, further comprising:
 a display module disposed on the external housing to be exposed outwards from another side of the external housing, and being electrically connected to the wireless communication module,
 wherein the pin-shaped antenna unit and the display module are respectively located at the different sides of the external housing.

5. The wearable electronic device of claim 1, wherein the wireless communication module is a blue-tooth wireless communication module, an infrared transmission module, a radio frequency identification (RFID) module, a WIFI network module or a near-field communication (NFC) module.

6. The wearable electronic device of claim 1, wherein the wearable electronic device is a digital watch, glasses or an earphone.

7. The wearable electronic device of claim 1, wherein the wearable member is a wrist-worn watchband, and the pin-shaped antenna unit is a watchband spring pin for being engaged with the joint portion.

8. A wearable electronic device, comprising:
 a main body comprising:
  a wireless communication module; and
  a conductive member electrically connected to the wireless communication module;
 a first watchband spring pin engaged with a first side of the main body, and being electrically connected to the wireless communication module by physically contacting with the conductive member, the first watchband spring pin being an antenna unit of the wireless communication module;
 a second watchband spring pin engaged with a second side of the main body being opposite to the first side thereof; and
 at least one wrist-worn watchband connected to the first watchband spring pin and the second watchband spring pin.

9. The wearable electronic device of claim 8, wherein the wireless communication module comprises:
 a wiring board;
 a wireless communication unit disposed on the wiring board; and
 an electrical connection portion disposed on the wiring board, and electrically connected to the conductive member and the wireless communication unit.

10. The wearable electronic device of claim 9, wherein the electrical connection portion is a metal boss or a metal clip.

11. The wearable electronic device of claim 8, further comprising:
   a display module disposed on a third side of the main body, and arranged between the first side and second side thereof, and being electrically connected to the wireless communication module.

12. The wearable electronic device of claim 8, wherein the wireless communication module is a blue-tooth wireless communication module, an infrared transmission module, a radio frequency identification (RFID) module, a WIFI network module or a near-field communication (NFC) module.

\* \* \* \* \*